(12) United States Patent
Scheffer et al.

(10) Patent No.: US 9,117,568 B2
(45) Date of Patent: Aug. 25, 2015

(54) POLYMER COMPOSITIONS CONTAINING CARBONACEOUS FILLERS

(75) Inventors: Dan Scheffer, Columbia, MD (US); Vipin Varma, Ghent (BE)

(73) Assignee: Vorbeck Materials Corp., Jessup, MD (US)

( * ) Notice: Subject to any disclaimer, the term of this patent is extended or adjusted under 35 U.S.C. 154(b) by 201 days.

(21) Appl. No.: 12/753,870

(22) Filed: Apr. 3, 2010

(65) Prior Publication Data

US 2011/0086206 A1   Apr. 14, 2011

Related U.S. Application Data

(60) Provisional application No. 61/166,353, filed on Apr. 3, 2009.

(51) Int. Cl.
| | | |
|---|---|---|
| C08K 3/04 | (2006.01) | |
| C09D 11/10 | (2014.01) | |
| C09D 7/12 | (2006.01) | |
| C09D 5/24 | (2006.01) | |
| H01B 1/24 | (2006.01) | |
| C09D 11/52 | (2014.01) | |
| C08K 5/098 | (2006.01) | |
| C08K 5/17 | (2006.01) | |
| C08K 5/19 | (2006.01) | |

(52) U.S. Cl.
CPC .. *H01B 1/24* (2013.01); *C09D 5/24* (2013.01); *C09D 7/1216* (2013.01); *C09D 7/1233* (2013.01); *C09D 11/52* (2013.01); *C08K 3/04* (2013.01); *C08K 5/098* (2013.01); *C08K 5/17* (2013.01); *C08K 5/19* (2013.01); *C08L 2203/206* (2013.01)

(58) Field of Classification Search
USPC .................................. 524/424, 606, 607, 320
See application file for complete search history.

(56) References Cited

FOREIGN PATENT DOCUMENTS

WO   WO 2009123771 A2 * 10/2009 .............. H01L 51/00

OTHER PUBLICATIONS

MSDS of Versamid 750 (Jun. 29, 2012).*

* cited by examiner

*Primary Examiner* — Vu A Nguyen
(74) *Attorney, Agent, or Firm* — Kate Redmond

(57) ABSTRACT

Compositions comprising carbonaceous filler, polymeric binder, and at least one organic compound having at least one charged functional group.

18 Claims, No Drawings

POLYMER COMPOSITIONS CONTAINING CARBONACEOUS FILLERS

FIELD OF THE INVENTION

The present invention relates to compositions comprising at least one carbonaceous filler, at least one polymeric binder, and at least one organic compound having at least one charged functional group.

BACKGROUND

Polymeric compositions are finding increased use in many areas that have traditionally been the domain of other materials such as metals. In part this is because of the physical properties of polymeric materials, their light weight, their cost, etc. Furthermore, many polymeric materials (depending on the characteristics of the particular resin) have the ability to be formed into a wide variety of shapes and forms, including intricate parts and physically flexible forms. Polymeric materials have great flexibility in the forms they can take on and (depending on the characteristics of the particular resin) can be used as molding and extrusion resins, pastes, powders, dispersions, coatings, etc.

Many of the applications for which it would be desirable to use polymer compositions need to use materials having electrical conductivity. However, most polymeric materials are not intrinsically electrically or thermally conductive enough for some of these applications. Conductive polymeric resin compositions can be made in some cases by adding fillers to polymers, but high loadings are often required, which can be to the detriment of physical and other properties of the materials, as well as lead to melt processing difficulties when thermoplastic materials are used, among other possible drawbacks.

The use of polymer-based coating compositions is particularly desirable in a number of applications, including those where electrical conductivity is desired, as they can not only have cost, weight, processability, and flexibility of design advantages over metals, but can be used in cases where metals would often be impractical, such to make flexible devices (like displays). Traditionally, electrically conductive inks and coatings have often relied on the additional of metal particles to impart conductivity, but the metals are often expensive, can be susceptible to oxidation, and can require the use of extra steps such as sintering for optimal conductivity.

Carbonaceous materials such as carbon black have been used for to make conductive polymer compositions, including coatings, but in many cases they are insufficiently conductive for many applications or require loadings that are too high and, for example, harm certain desirable physical properties of the materials. It would thus be desirable to obtain compositions having enhanced electrical conductivity, including those that maintain at least some desirable properties.

SUMMARY OF THE INVENTION

Disclosed herein are compositions comprising at least one carbonaceous filler, at least one polymeric binder, and at least one organic compound having at least one charged functional group and articles made therefrom. Further disclosed are methods of making compositions.

DETAILED DESCRIPTION OF THE INVENTION

The compositions comprise at least one carbonaceous filler, at least one polymeric binder, and at least one organic compound having at least one charged functional group (also referred to herein as a "charged organic compound").

The charged organic compound comprises at least one ionic functional group and one hydrocarbon-based chain. Examples of ionic functional groups include ammonium salts, sulfates, sulphonates, phosphates, carboxylates, etc. If two or more ionic functional groups are present, they may be of the same or different types. The compound may comprise additional functional groups, including, but not limited to hydroxyls, alkenes, alkynes, carbonyl groups (such as carboxylic acids, esters, amides, ketones, aldehydes, anhydrides, thiol, etc.), ethers, fluoro, chloro, bromo, iodo, nitriles, nitrogen containing groups, phosphorous containing groups, silicon containing groups, etc.

The compound comprises at least one hydrocarbon-based chain. The hydrocarbon-based chain may be saturated or unsaturated and may be branched or linear. It may be an alkyl group, alkenyl group, alkynyl group, etc. It need not contain only carbon and hydrogen atoms. It may be substituted with other functional groups (such as those mentioned above). Other functional groups, such as esters, ethers, amides, may be present in the length of the chain. In other words, the chain may contain two or more hydrocarbon-based segments that are connected by one or more functional groups. In one embodiment, at least one ionic functional group is located at the end of a chain.

Examples of ammonium salts include materials having the formula: $R^1R^2R^3R^4N^+X^-$, where $R^1$, $R^2$, and $R^3$, are each independently H, a hydrocarbon-based chain, an aryl-containing group, an alicyclic group; an oligomeric group, a polymeric group, etc.; where $R^4$ is a hydrocarbon-based chain having at least four carbon atoms; and where $X^-$ is an anion such as fluoride, bromide, chloride, iodide, sulfate, hydroxide, carboxylate, etc. Any of the R groups may have one or more additional ammonium groups.

Examples of R groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, $C_{21}$ to $C_{40}$ chains, etc.

Examples of quaternary ammonium salts include tetraalkylammonium salts, dialkyldimethylammonium salts, alkyltrimethylammonium salts, where the alkyl groups are one or more groups containing at least eight carbon atoms. Examples include tetradodecylammonium, tetradecyltrimethylammonium halide, hexadecyltrimethylammonium halide, didodecyldimethylammonium halide, etc.

Ammonium salts may be bis- or higher order ammonium salts, including quaternary ammonium salts. They may be salts of carboxylic acids, dicarboxylic acids, tricarboxylic acids, and higher carboxylic acids. The carboxylic acids may have be part of a hydrocarbon-based chain having at least about four linear carbon atoms. Examples include ammonium salts of octanoic acid, nonanoic acid, decanoic acid, undecanoic acid, dodecanoic acid, tridecanoic acid, tetradecanoic acid, pentadecanic acid, carboxylic acids having at least 15 carbon atoms, stearic acid, oleic acid, montanic acid, apidic acid, 1,7-heptanedioic acid, 1,8-octandioic acid, 1,9-nonanedioic acid, sebacic acid, 1,11-undecandioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nonadecanedioic acid, 1,20-eicosanedioic acid, dicarboxylic acids having 21 to 40 carbon atoms, etc.

Alkylol ammonium salts of carboxylic acids (including high molecular weight carboxylic acids and unsaturated carboxylic acids) may be used. Examples include EFKA 5071, an alkylol ammonium salt of a high-molecular weight carboxylic acid supplied by Ciba and BYK-ES80, an alkylolamonium salt of an unsaturated acidic carboxylic acid ester manufactured by BYK USA, Wallingford, Conn. The charged organic compound may have a sulfur-containing group such as a sulphonate, mesylate, triflate, tosylate, besylate, sulfates, sulfite, peroxomonosulfate, peroxodisulfate, pyrosulfate, dithionate, metabisulfite, dithionite, thiosulfate, tetrathionate, etc. The organic compound may also contain two or more sulfur containing groups.

Alkyl, alkenyl, and/or alkynyl sulfates and sulphonates are preferred sulfur-containing compounds. The alkyl, alkenyl, and/or alkynyl groups preferably contain at least about 8 carbon atoms, or more preferably at least about 10 carbon atoms. Examples include decylsulfate salts, dodecylsulfate salts (such as sodium 1-dodecanesulfate (SDS)), decylsulfonate salts, dodecylsulfonate salts (such as sodium 1-dodecanesulfonate (SDSO)), etc. The counter ions may be any suitable cations, such as lithium, sodium, potassium, ammonium, etc.

The polymeric binders can be thermosets, thermoplastics, non-melt processible polymers, etc. Examples of polymers include, but are not limited to polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly(methyl methacrylate) and other acrylate polymers and copolymers, olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly(phenylene oxide) (PPO), PPO-polyamide alloys, polysulphone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly (vinylidene chloride), and poly(vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane), etc.), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly(ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, UV-curable resins, etc.

Examples of elastomers include, but are not limited to, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly (propylene oxide), and their copolymers).

Examples of polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6)) and polyterephthalamides such as poly (dodecamethylene terephthalamide) (polyamide 12,T), poly (decamethylene terephthalamide) (polyamide 10,T), poly (nonamethylene terephthalamide) (polyamide 9,T), the polyamide of hexamethylene terephthalamide and hexamethylene adipamide, the polyamide of hexamethyleneterephthalamide, and 2-methylpentamethyleneterephthalamide), etc.

The polyamides may be polymers and copolymers (i.e., polyamides having at least two different repeat units) having melting points between about 100 and about 255° C., or between about 120 and about 255° C., or between about 110 and about 255° C. or between about 120 and about 255° C. These include aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, of about 150° C. or less, of about 130° C. or less, of about 120° C. or less, of about 110° C. or less, etc. Examples of these include those sold under the trade names Macromelt by Henkel, Versamid by Cognis, and Elvamide® by DuPont.

Examples of polyesters include, but are not limited to, poly(butylene terephthalate) (PBT), poly(ethylene terephthalate) (PET), poly(1,3-propylene terephthalate) (PPT), poly (ethylene naphthalate) (PEN), poly(cyclohexanedimethanol terephthalate) (PCT)), etc.

Examples of suitable polymers include Elvacite® polymers supplied by Lucite International, Inc., including Elvacite® 2009, 2010, 2013, 2014, 2016, 2028, 2042, 2045, 2046, 2550, 2552, 2614, 2669, 2697, 2776, 2823, 2895, 2927, 3001, 3003, 3004, 4018, 4021, 4026, 4028, 4044, 4059, 4400, 4075, 4060, 4102, etc. Other polymer families include Bynel® polymers (such as Bynel® 2022 supplied by DuPont) and Joncryl® polymers (such as Joncryl® 678 and 682).

In some embodiments, the binder includes at least one polymer having a melting point or glass transition temperature no greater than about 110° C., or no greater than about 100° C., or no greater than about 90° C.

Suitable carbonaceous fillers include, but are not limited to, graphene sheets, graphite (including natural, Kish, and synthetic/pyrolytic graphites), expanded graphite, expandable graphite, graphite oxide, carbon nanotubes (including single- and multi-walled nanotubes), fullerenes, carbon black, carbon fibers and fibrils, vapor-grown carbon nanofibers, metal coated carbon fibers, activated carbon, carbon fibers, hollow carbon spheres, carbon foams, etc. Preferred fillers include graphene sheets, graphite, carbon black, graphite oxide, and carbon nanotubes.

Preferred graphene sheets are graphite-based sheets preferably having a surface area of from about 100 to about 2630 $m^2/g$. In some embodiments of the present invention, the graphene sheets primarily, almost completely, or completely comprise fully exfoliated single sheets of graphite (these are approximately 1 nm thick and are often referred to as "graphene"), while in other embodiments, they may comprise at least a portion partially exfoliated graphite sheets, in which two or more sheets of graphite have not been exfoliated from each other. The graphene sheets may comprise mixtures of fully and partially exfoliated graphite sheets.

Graphene sheets may be made using any suitable method. For example, they may be obtained from graphite, graphite oxide, expandable graphite, expanded graphite, etc. They may be obtained by the physical exfoliation of graphite, by for example, peeling off sheets graphene sheets. They may be made from inorganic precursors, such as silicon carbide. They may be made by chemical vapor deposition (such as by reacting a methane and hydrogen on a metal surface). They may be may by the reduction of an alcohol, such ethanol, with a metal (such as an alkali metal like sodium) and the subsequent pyrolysis of the alkoxide product (such a method is reported in *Nature Nanotechnology* (2009), 4, 30-33). They may be made by the exfoliation of graphite in dispersions or exfoliation of graphite oxide in dispersions and the subsequently reducing the exfoliated graphite oxide. Graphene sheets may be made by the exfoliation of expandable graphite, followed by intercalation, and ultrasonication or other means of separating the intercalated sheets (see, for example, *Nature Nanotechnology* (2008), 3, 538-542. They may be made by the intercalation of graphite and the subsequent exfoliation of the product in suspension, thermally, etc.

Graphene sheets may be made from graphite oxide (also known as graphitic acid or graphene oxide). Graphite may be treated with oxidizing and/or intercalating agents and exfoliated. Graphite may also be treated with intercalating agents and electrochemically oxidized and exfoliated. Graphene sheets may be formed by ultrasonically exfoliating suspensions of graphite and/or graphite oxide in a liquid (which may contain surfactants and/or intercalants). Exfoliated graphite oxide dispersions or suspensions can be subsequently reduced to graphene sheets. Graphene sheets may also be formed by mechanical treatment (such as grinding or milling) to exfoliate graphite or graphite oxide (which would subsequently be reduced to graphene sheets).

Reduction of graphite oxide to graphene sheets may be by means of chemical reduction and may be carried out on graphite oxide in a solid form, in a dispersion, etc. Examples of useful chemical reducing agents include, but are not limited to, hydrazines (such as hydrazine, N,N-dimethylhydrazine, etc.), sodium borohydride, citic acid, hydroquinone, isocyanates (such as phenyl isocyanate), hydrogen, hydrogen plasma, etc. For example, a dispersion of exfoliated graphite oxide in a carrier (such as water, organic solvents, or a mixture of solvents) can be made using any suitable method (such as ultrasonication and/or mechanical grinding or milling) and reduced to graphene sheets.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. A preferred intercalation agent includes sulfuric acid. Graphite may also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US 2007/0092432, the disclosure of which is hereby incorporated herein by reference. The thusly formed graphene sheets may display little or no signature corresponding to graphite or graphite oxide in their X-ray diffraction pattern.

The thermal exfoliation can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating may be done using a flash lamp.

During heating, the graphite oxide may be contained in an essentially constant location in single batch reaction vessel, or may be transported through one or more vessels during the reaction in a continuous or batch mode. Heating may be done using any suitable means, including the use of furnaces and infrared heaters.

Examples of temperatures at which the thermal exfoliation of graphite oxide may be carried out are at least about 300° C., at least about 400° C., at least about 450° C., at least about 500° C., at least about 600° C., at least about 700° C., at least about 750° C., at least about 800° C., at least about 850° C., at least about 900° C., at least about 950° C., and at least about 1000° C. Preferred ranges include between about 750 about and 3000° C., between about 850 and 2500° C., between about 950 and about 2500° C., and between about 950 and about 1500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature may vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets may be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used may be, for example, between about 750 about and 3000° C., or between about 850 and 2500° C., or between about 950 and about 2500° C.

The time of heating can be for example, at least about 1 second, or at least about 10 second, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature may vary within these ranges.

The heating may be done under a variety of conditions, including in an inert atmosphere (such as argon or nitrogen) or a reducing atmosphere, such as hydrogen (including hydrogen diluted in an inert gas such as argon or nitrogen), or under vacuum. The heating may be done in any appropriate vessel, such as a fused silica or a mineral or ceramic vessel or a metal vessel. The materials being heated including any starting materials and any products or intermediates) may be contained in an essentially constant location in single batch reaction vessel, or may be transported through one or more vessels during the reaction in a continuous or batch reaction. Heating may be done using any suitable means, including the use of furnaces and infrared heaters.

The graphene sheets preferably have a surface area of at least about 100 $m^2/g$ to, or of at least about 200 $m^2/g$, or of at least about 300 $m^2/g$, or of least about 350 $m^2/g$, or of least about 400 $m^2/g$, or of least about 500 $m^2/g$, or of least about 600 $m^2/g$., or of least about 700 $m^2/g$, or of least about 800 $m^2/g$, or of least about 900 $m^2/g$, or of least about 700 $m^2/g$. The surface area may be about 400 to about 1100 $m^2/g$. The theoretical maximum surface area can be calculated to be. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 $m^2/g$.

The graphene sheets preferably have number average aspect ratios of about 100 to 100,000 (where "aspect ratio" is defined as the ratio of the longest dimension of the sheet to the shortest).

Surface area can be measured using either the nitrogen adsorption/BET method at 77 K or a methylene blue (MB) dye method in liquid solution. The BET method is preferred.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 $m^2$ of surface covered per one mg of MB adsorbed.

The graphene sheets may have a bulk density of from about 0.1 to at least about 200 $kg/m^3$. The bulk density includes all values and subvalues therebetween, especially including 0.5, 1, 5, 10, 15, 20, 25, 30, 35, 50, 75, 100, 125, 150, and 175 $kg/m^3$.

The graphene sheets may be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1. In some embodiments of the invention, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets may contain atomic scale kinks due to the presence of lattice defects in the honeycomb structure of the graphite basal plane. These kinks can be desirable to prevent the stacking of the single sheets back to graphite oxide and/or other graphite structures under the influence of van der Waals forces.

The compositions may take on a variety of forms. They may be polymeric resins, molded composites, extruded articles, suspensions or dispersions, pastes, powders, films, coatings, filaments, fibers, etc.

The charged organic compound may be present in about 1 to about 75 weight percent, in about 2 to about 70 weight percent, in about 2 to about 60 weight percent, in about 2 to about 50 weight percent, in about 5 to about 50 weight percent, in about 10 to about 50 weight percent, in about 10 to about 40 weight percent, in about 20 to about 40 weight percent, based on the total weight of charged organic compound and carbonaceous filler.

The carbonaceous filler(s) can be present in about 1 to about 98 weight percent, about 5 to about 98 weight percent, about 10 to about 98 weight, about 20 to about 98 weight percent, in about 30 to about 95 weight percent, in about 40 to about 95 weight percent, in about 50 to about 95 weight percent, and in about 70 to about 95 weight percent, based on the total amount of carbonaceous filler and binder.

The compositions may be well-mixed blends in which the carbonaceous fillers are dispersed in the polymer. They may be formed using any means known in the art. When the polymer is one or more thermoplastics, they may be made using any suitable melt-mixing method, such as using a single or twin-screw extruder, a blender, a kneader, or a Banbury mixer. In one embodiment of the invention, the compositions are melt-mixed blends wherein the non-polymeric ingredients are well-dispersed in the polymer matrix, such that the blend forms a unified whole.

The compositions may be formed by polymerizing monomers in the presence of the carbonaceous fillers and/or organic compound and/or other components.

The compositions may be formed into articles using any suitable technique, including compression molding, extrusion, ram extrusion, injection molding, extrusion, co-extrusion, rotational molding, blow molding, injection blow molding, thermoforming, vacuum forming, casting, solution casting, centrifugal casting, overmolding, resin transfer molding, vacuum assisted resin transfer molding, spinning, printing, etc.

When melt-processing techniques are used, the compositions are preferably melt-blended mixtures.

The compositions can be electrically conductive. They can have a conductivity of at least about $10^{-8}$ S/m. It can can have a conductivity of about $10^{-6}$ S/m to about $10^5$ S/m, or of about $10^{-5}$ S/m to about $10^5$ S/m. In other embodiments of the invention, the compositions have conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about 10,000 S/m, or at least about 20,000 S/m, or at least about 30,000 S/m, or at least about 40,000 S/m, or at least about 50,000 S/m, or at least about 60,000 S/m, or at least about 75,000 S/m, or at least about $10^5$ S/m, or at least about $10^6$ S/m. In some embodiments, the surface resistivity of the coated substrate may be no greater than about 10000 Ω/square, or no greater than about 5000 Ω/square, or no greater than about 1000 Ω/square or no greater than about 700 Ω/square, or no greater than about 500 Ω/square, or no greater than about 350 Ω/square, or no greater than about 200 Ω/square, or no greater than about 200 Ω/square, or no greater than about 150 Ω/square, or no greater than about 100 Ω/square, or no greater than about 75 Ω/square, or no greater than about 50 Ω/square, or no greater than about 30 Ω/square, or no greater than about 20 Ω/square, or no greater than about 10 Ω/square, or no greater than about 5 Ω/square, or no greater than about 1 Ω/square, or no greater than about 0.1 Ω/square, or no greater than about 0.01 Ω/square, or no greater than about 0.001 Ω/square.

In cases where the compositions are in the form of suspensions or dispersions or where the polymeric binder can be cured or otherwise treated after being combined (blended) with the graphene sheets and the other components, the conductivities and/or resistivities may be determined before or after the blends have been dried, cured, cross-linked or otherwise treated.

The compositions can have a thermal conductivity of about 0.1 to about 50 W/(m-K), or of about 0.5 to about 30 W/(m-K), or of about 1 to about 30 W/(m-K), or of about 1 to about 20 W/(m-K), or of about 1 to about 10 W/(m-K), or of about 1 to about 5 W/(m-K), or of about 2 to about 25 W/(m-K), or of about 5 to about 25 W/(m-K).

The compositions may comprise additional additives, such as other fillers and reinforcing agents (such as glass fibers and mineral fibers such as wollastonite), tougheners and impact modifiers, flame retardants, plasticizers, antioxidants, UV stabilizers, heat stabilizers, lubricants, processing aids, mold release agents, colorants, etc.

The compositions may optionally contain additional electrically conductive components other than the carbonaceous fillers, such as metals (including metal alloys), conductive metal oxides, polymers, and metal-coated materials. These components can take a variety of forms, including particles, powders, flakes, foils, needles, etc.

Examples of metals include, but are not limited to silver, copper, aluminum, platinum, palladium, nickel, chromium, gold, bronze, colloidal metals, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene (PEDOT), poly(styrenesulfonate) (PSS), PEDOT:PSS copolymers, polythiophene and polythiophenes, poly(3-alkylthiophenes), poly(2,5-bis(3-tetradecylthiophen-2-yl)thieno[3,2-b]thiophene) (PBTTT), poly(phenylenevinylene), polypyrene, polycarbazole, polyazulene, polyazepine, polyflurorenes, polynaphthalene, polyisonaphthalene, polyaniline, polypyrrole, poly(phenylene sulfide), copolymers of one or more of the foregoing, etc., and their derivatives and copolymers. The conductive polymers may be doped or undoped. They may be doped with boron, phosphorous, iodine, etc.

In one embodiment, the carbonaceous filler comprises graphene sheets and graphite. The ratio by weight of graphite to graphene sheets may be from about 2:98 to about 98:2, or from about 5:95 to about 95:5, or from about 10:90 to about 90:10, or from about 20:80 to about 80:20, or from about 30:70 to 70:30, or from about 40:60 to about 90:10, or from about 50:50 to about 85:15, or from about 60:40 to about 85:15, or from about 70:30 to about 85:15.

The graphene sheets may comprise two or more graphene powders having different particle size distributions and/or morphologies. The graphite may also comprise two or more graphite powders having different particle size distributions and/or morphologies.

The compositions may optionally comprise at least one "multi-chain lipid", by which term is meant a naturally-occurring or synthetic lipid having a polar head group and at least two nonpolar tail groups connected thereto. Examples of polar head groups include oxygen-, sulfur-, and halogen-containing, phosphates, amides, ammonium groups, amino acids (including α-amino acids), saccharides, polysaccharides, esters (Including glyceryl esters), zwitterionic groups, etc.

The tail groups may the same or different. Examples of tail groups include alkanes, alkenes, alkynes, aromatic compounds, etc. They may be hydrocarbons, functionalized hydrocarbons, etc. The tail groups may be saturated or unsaturated. They may be linear or branched. The tail groups may be derived from fatty acids, such as oleic acid, palmitic acid, stearic acid, arachidic acid, erucic acid, arachadonic acid, linoleic acid, linolenic acid, oleic acid, etc.

Examples of multi-chain lipids include, but are not limited to, lecithin and other phospholipids (such as phosphoglycerides (including phosphatidylserine, phosphatidylinositol, phosphatidylethanolamine (cephalin), and phosphatidylglycerol) and sphingomyelin); glycolipids (such as glucosyl-cerebroside); saccharolipids; sphingolipids (such as ceramides, di- and triglycerides, phosphosphingolipids, and glycosphingolipids); etc. They may be amphoteric, including zwitterionic.

The compositions may be in the form of coatings. By the term "coating" is meant a composition that is in a form that is suitable for application to a substrate as well as the material after it is applied to the substrate, while it is being applied to the substrate, and both before and after any post-application treatments (such as evaporation, cross-linking, curing, etc.).

The components of the coating compositions may vary during these stages. As used here, the term "coating" can refer to an ink.

The coatings may be made using any suitable method, including wet or dry methods and batch, semi-continuous, and continuous methods.

For example, components of the coatings, such as one or more of the graphene sheets, graphite, binders, carriers, and/or other components may be processed (e.g., milled/ground, blended, etc. by using suitable mixing, dispersing, and/or compounding techniques and apparatus, including ultrasonic devices, high-shear mixers, ball mills, attrition equipment, sandmills, two-roll mills, three-roll mills, cryogenic grinding crushers, extruders, kneaders, double planetary mixers, triple planetary mixers, high pressure homogenizers, ball mills, attrition equipment, sandmills, horizontal and vertical wet grinding mills, etc. Processing (including grinding) technologies can be wet or dry and can be continuous or discontinuous. Suitable materials for use as grinding media include metals, carbon steel, stainless steel, ceramics, stabilized ceramic media (such as yttrium stabilized zirconium oxide), PTFE, glass, tungsten carbide, etc. Methods such as these can be used to change the particle size and/or morphology of the graphite, graphene sheets, other components, and blends or two or more components.

Components may be processed together or separately and may go through multiple processing (including mixing/blending) stages, each involving one or more components (including blends).

There is no particular limitation to the way in which the graphene sheets, graphite, and other components are processed and combined. For example, graphene sheets and/or graphite may be processed into given particle size distributions and/or morphologies separately and then combined for further processing with or without the presence of additional components. Unprocessed graphene sheets and/or graphite may be combined with processed graphene sheets and/or graphite and further processed with or without the presence of additional components. Processed and/or unprocessed graphene sheets and/or processed and/or unprocessed graphite may be combined with other components, such as one or more binders and then combined with processed and/or unprocessed graphene sheets and/or processed and/or unprocessed graphite. Two or more combinations of processed and/or unprocessed graphene sheets and/or processed and/or unprocessed graphite that have been combined with other components may be further combined or processed.

In one embodiment, if a multi-chain lipid is used, it is added to graphene sheets and/or graphite before processing.

After processing (such as blending and/or grinding steps), additional components may be added to the coatings, including, but not limited to, binders, thickeners, viscosity modifiers, etc. The coatings may also be diluted by the addition of more carrier.

In a preferred embodiment, the charged organic compound is added to the composition after the carbonaceous filler is subjected to one or more blending and/or grinding steps in the presence of the carrier. The binder may be added at any point in the process (or at two or more points).

The carbonaceous filler(s) are preferably present in the coatings in about 20 to about 98 weight percent, in about 30 to about 95 weight percent, in about 40 to about 95 weight percent, in about 50 to about 95 weight percent, and in about 70 to about 95 weight percent, based on the total amount of carbonaceous filler and binder.

The coatings optionally comprise one or more carriers in which some or all of the components are dissolved, suspended, or otherwise dispersed or carried. Examples of suitable carriers include, but are not limited to, water, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Ecolink)), terpenes and terpene alcohols (including terpineols, including alpha-terpineol), limonene, aliphatic petroleum distillates, alcohols (such as methanol, ethanol, n-propanol, i-propanol, n-butanol, i-butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8,trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers, ester and alcohols (such as 2-(2-ethoxyethoxy)ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by SpecialChem)), imides, amides (such as dimethyl formamide, dimethylacetamide, etc.), cyclic amides (such as N-methylpyrrolidone and 2-pyrrolidone), lactones (such as beta-propiolactone, gamma-valerolactone, delta-valerolactone, gamma-butyrolactone, epsilon-caprolactone), cyclic imides (such as imidazolidinones such as N,N'-dimethylimidazolidinone (1,3-dimethyl-2-imidazolidinone)). and mixtures of two or more of the foregoing and mixtures of one or more of the foregoing with other carriers. Solvents may be low- or non-VOC solvents, non-hazardous air pollution solvents, and non-halogenated solvents.

The coatings may optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, cross-linking and curing agents, etc.

Examples of dispersing aids include glycol ethers (such as poly(ethylene oxide)), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate), isopropoxy titanium acetylacetonate, and others sold by Johnson-Matthey Catalysts under the trade name Vertec®.

Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, etc. salts of stearates, oleats, palmitates, etc.), aluminosilicates (such as those sold under the Minex® name by Unimin Specialty Minerals and Aerosil® 9200 by Evonik Degussa), fumed silica, natural and synthetic zeolites, etc.

The coatings may be applied to a wide variety of substrates, including, but not limited to, flexible and/or stretchable materials, silicones and other elastomers and other polymeric materials, metals (such as aluminum, copper, steel, stainless steel, etc.), adhesives, fabrics (including cloths) and textiles (such as cotton, wool, polyesters, rayon, etc.), clothing, glasses and other minerals, ceramics, silicon surfaces, wood, paper, cardboard, paperboard, cellulose-based materials, glassine, labels, silicon and other semiconductors, laminates, corrugated materials, concrete, bricks, and other building materials, etc. Substrates may in the form of films, papers, wafers, larger three-dimensional objects, etc.

The substrates may have been treated with other coatings (such as paints) or similar materials before the coatings are applied. Examples include substrates (such as PET) coated with indium tin oxide, antimony tin oxide, etc. They may be woven, nonwoven, in mesh form; etc. They may be woven, nonwoven, in mesh form; etc.

The substrates may be paper-based materials generally (including paper, paperboard, cardboard, glassine, etc.). Paper-based materials can be surface treated. Examples of surface treatments include coatings such as polymeric coatings, which can include PET, polyethylene, polypropylene, acetates, nitrocellulose, etc. Coatings may be adhesives. The paper based materials may be sized.

Examples of polymeric materials include, but are not limited to, those comprising thermoplastics and thermosets, including elastomers and rubbers (including thermoplastics and thermosets), silicones, fluorinated polysiloxanes, natural rubber, butyl rubber, chlorosulfonated polyethylene, chlorinated polyethylene, styrene/butadiene copolymers (SBR), styrene/ethylene/butadiene/stryene copolymers (SEBS), styrene/ethylene/butadiene/stryene copolymers grafted with maleic anhydride, styrene/isoprene/styrene copolymers (SIS), polyisoprene, nitrile rubbers, hydrogenated nitrile rubbers, neoprene, ethylene/propylene copolymers (EPR), ethylene/propylene/diene copolymers (EPDM), ethylene/vinyl acetate copolymer (EVA), hexafluoropropylene/vinylidene fluoride/tetrafluoroethylene copolymers, tetrafluoroethylene/propylene copolymers, fluorelastomers, polyesters (such as poly(ethylene terephthalate), poly(butylene terephthalate), poly(ethylene naphthalate), liquid crystalline polyesters, poly(lactic acid), etc).; polystyrene; polyamides (including polyterephthalamides); polyimides (such as Kapton®); aramids (such as Kevler® and Nomex®); fluoropolymers (such as fluorinated ethylene propylene (FEP), polytetrafluoroethylene (PTFE), poly(vinyl fluoride), poly(vinylidene fluoride), etc.); polyetherimides; poly(vinyl chloride); poly(vinylidene chloride); polyurethanes (such as thermoplastic polyurethanes (TPU); spandex, cellulosic polymers (such as nitrocellulose, cellulose acetate, etc.); styrene/acrylonitriles polymers (SAN); arcrylonitrile/butadiene/styrene polymers (ABS); polycarbonates; polyacrylates; poly(methyl methacrylate); ethylene/vinyl acetate copolymers; thermoset epoxies and polyurethanes; polyolefins (such as polyethylene (including low density polyethylene, high density polyethylene, ultrahigh molecular weight polyethylene, etc.), polypropylene (such as biaxially-oriented polypropylene, etc.); Mylar; etc. They may be non-woven materials, such as DuPont Tyvek®. They may be adhesive materials.

The substrate may be a transparent or translucent or optical material, such as glass, quartz, polymer (such as polycarbonate or poly(meth)acrylates (such as poly(methyl methacrylate).

The coatings may be applied to the substrate using any suitable method, including, but not limited to, painting, pouring, spin casting, solution casting, dip coating, powder coating, lamination, extrusion, by syringe or pipette, spray coating, curtain coating, electrospray deposition, ink-jet printing, spin coating, thermal transfer (including laser transfer) methods, doctor blade printing, screen printing, rotary screen printing, gravure printing, capillary printing, offset printing, electrohydrodynamic (EHD) printing (a method of which is described in WO 2007/053621, which is hereby incorporated herein by reference), flexographic printing, pad printing, stamping, xerography, microcontact printing, dip pen nanolithography, laser printing, via pen or similar means, etc. The coatings can be applied in multiple layers.

After they have been applied to a substrate, the coatings may be cured using any suitable technique, including drying and oven-drying (in air or another inert or reactive atmosphere), UV curing, IR curing, drying, crosslinking, thermal curing, laser curing, IR curing, microwave curing or drying, sintering, and the like.

In some embodiments, the curing may be thermal curing and may take place at a temperature of no more than about 135° C., or no more than about 120° C., or no more than about 110° C., or no more than about 100° C., or no more than about 90° C., or no more than about 80° C., or no more than about 70° C.

When applied to a substrate, the coatings can have a variety of thicknesses. In one embodiment, when applied to a substrate, after curing the coating can optionally have a thickness of at least about 2 nm, or at least about 5 nm. In various embodiments of the invention, the coatings can optionally have a thickness of about 2 nm to 2 mm, about 5 nm to 1 mm, about 2 nm to about 100 nm, about 2 nm to about 200 nm, about 2 nm to about 500 nm, about 2 nm to about 1 micrometer, about 5 nm to about 200 nm, about 5 nm to about 500 nm, about 5 nm to about 1 micrometer, about 5 nm to about 50 micrometers, about 5 nm to about 200 micrometers, about 10 nm to about 200 nm, about 50 nm to about 500 nm, about 50 nm to about 1 micrometer, about 100 nm to about 10 micrometers, about 1 micrometer to about 2 mm, about 1 micrometer to about 1 mm, about 1 micrometer to about 500 micrometers, about 1 micrometer to about 200 micrometers, about 1 micrometer to about 100 micrometers, about 50 micrometers to about 1 mm, about 100 micrometers to about 2 mm, about 100 micrometers to about 1 mm, about 100 micrometers to about 750 micrometers, about 100 micrometers to about 500 micrometers, about 500 micrometers to about 2 mm, or about 500 micrometers to about 1 mm.

When applied to a substrate, the coatings can have a variety of forms. They can be present as a film or lines, patterns, letters, numbers, circuitry, logos, identification tags, and other shapes and forms. The coatings may be covered in whole or in part with additional material, such as overcoatings, varnishes, polymers, fabrics, etc.

The coatings can be applied to the same substrate in varying thicknesses at different points and can be used to build up three-dimensional structures on the substrate.

The compositions may be used in applications requiring electrical conductivity, static dissipativity, electromagnetic interference shielding properties, etc., including when these properties are needed along with properties such as barrier properties, moisture resistance, etc.

Examples of articles made at least in part from the compositions include fuel system components (such as fuel lines and tubing, fuel tank filler pipes and connectors, fuel line connectors, fuel pumps, fuel pump and delivery module components, fuel injector components, and fuel filter housings, fuel line grounding clips, fuel tank flanges, fuel filter clamps, fuel tank caps, and components comprising heat dissipation elements, such as heat sink fins, fuel tanks); automotive components such as electrical and electronic system connectors and housings, body panels and other body components; airplane components; pipes and tubes; seals; gaskets; electrical and electronic switches, connectors, housings, etc.; heat sinks; circuit board housings; contacts; antennas; electrodes; battery and ultracapacitor components; sensor components and housings; electronic devices housings (such as for televisions, computer equipment, video game systems, displays, portable electronic devices (such as cellular telephones, GPS receivers, music players, computers, game devices, etc.); rubber goods; tires; tanks and bottles (such as gas and liquid tanks, cryotanks, pressure vessels, etc.); etc.

The compositions may be used in applications requiring electrical conductivity, static dissipativity, electromagnetic interference shielding properties, etc.

The coatings can be used for the passivation of surfaces, such as metal (e.g. steel, aluminum, etc.) surfaces, including exterior structures such as bridges and buildings. Examples of other uses of the coatings include: UV radiation resistant coatings, abrasion resistant coatings, coatings having permeation resistance to liquids (such as hydrocarbon, alcohols, water, etc.) and/or gases, electrically conductive coatings, static dissipative coatings, and blast and impact resistant coatings. They can be used to make fabrics having electrical conductivity. The coatings can be used in solar cell applications; solar energy capture applications; signage, flat panel displays; flexible displays, including light-emitting diode, organic light-emitting diode, and polymer light-emitting diode displays; backplanes and frontplanes for displays; and lighting, including electroluminescent and OLED lighting. The displays may be used as components of portable electronic devices, such as computers, cellular telephones, games, GPS receivers, personal digital assistants, music players, games, calculators, artificial "paper" and reading devices, etc.

They may be used in packaging and/or to make labels. They may be used in inventory control and anti-counterfeiting applications (such as for pharmaceuticals), including package labels. They may be used to make smart packaging and labels (such as for marketing and advertisement, information gathering, inventory control, information display, etc.). They may be used to form a Faraday cage in packaging, such as for electronic components.

The coatings can be used on electrical and electronic devices and components, such as housings etc., to provide EMI shielding properties. They made be used in microdevices (such as microelectromechanical systems (MEMS) devices) including to provide antistatic coatings.

They may be used in the manufacture of housings, antennas, and other components of portable electronic devices, such as computers, cellular telephones, games, navigation systems, personal digital assistants, music players, games, calculators, radios, artificial "paper" and reading devices, etc.

The coatings can be used to form thermally conductive channels on substrates or to form membranes having desired flow properties and porosities. Such materials could have highly variable and tunable porosities and porosity gradients can be formed. The coatings can be used to form articles having anisotropic thermal and/or electrical conductivities. The coatings can be used to form three-dimensional printed prototypes.

The coatings can be used to make printed electronic devices (also referred to as "printed electronics) that may be in the form of complete devices, parts or sub elements of devices, electronic components, etc.

The coatings can be used to make printed electronic devices (also referred to as "printed electronics) that may be in the form of complete devices, parts or sub elements of devices, electronic components, etc.

Printed electronics may be prepared by applying the coating to a substrate in a pattern comprising an electrically conductive pathway designed to achieve the desired electronic device. The pathway may be solid, mostly solid, in a liquid or gel form, etc. The ink may further optionally comprise a carrier other than a binder. When the ink has been applied to the substrate, all or part of the carrier may be removed to form the electrically conductive pathway. The binder may be cured or cross-linked after the ink has been applied to the substrate.

The printed electronic devices may take on a wide variety of forms and be used in a large array of applications. They may contain multiple layers of electronic components (e.g. circuits) and/or substrates. All or part of the printed layer(s) may be covered or coated with another material such as a cover coat, varnish, cover layer, cover films, dielectric coatings, electrolytes and other electrically conductive materials, etc. There may also be one or more materials between the substrate and printed circuits. Layers may include semiconductors, metal foils, dielectric materials, etc.

The printed electronics may further comprise additional components, such as processors, memory chips, other microchips, batteries, resistors, diodes, capacitors, transistors, etc.

Other applications include, but are not limited to: passive and active devices and components; electrical and electronic circuitry, integrated circuits; flexible printed circuit boards; transistors; field-effect transistors; microelectromechanical systems (MEMS) devices; microwave circuits; antennas; diffraction gratings; indicators; chipless tags (e.g. for theft deterrence from stores, libraries, etc.); security and theft deterrence devices for retail, library, and other settings; key pads; smart cards; sensors; liquid crystalline displays (LCDs); signage; lighting; flat panel displays; flexible displays, including light-emitting diode, organic light-emitting diode, and polymer light-emitting diode displays; backplanes and frontplanes for displays; electroluminescent and OLED lighting; photovoltaic devices, including backplanes; product identifying chips and devices; membrane switches; batteries, including thin film batteries; electrodes; indicators; printed circuits in portable electronic devices (for example, cellular telephones, computers, personal digital assistants, global positioning system devices, music players, games, calculators, etc.); electronic connections made through hinges or other movable/bendable junctions in electronic devices such as cellular telephones, portable computers, folding keyboards, etc.); wearable electronics; and circuits in vehicles, medical devices, diagnostic devices, instruments, etc.

The electronic devices may be radiofrequency identification (RFID) devices and/or components thereof and/or radiofrequency communication device. Examples include, but are not limited to, RFID tags, chips, and antennas. The RFID devices may be ultrahigh frequency RFID devices, which typically operate at frequencies in the range of about 868 to about 928 MHz. Examples of uses for RFIDs are for tracking shipping containers, products in stores, products in transit, and parts used in manufacturing processes; passports; barcode replacement applications; inventory control applications; pet identification; livestock control; contactless smart cards; automobile key fobs; etc.

The electronic devices may also be elastomeric (such as silicone) contact pads and keyboards. Such devices can be used in portable electronic devices, such as calculators, cellular telephones, GPS devices, keyboards, music players, games, etc. They may also be used in myriad other electronic applications, such as remote controls, touch screens, automotive buttons and switches, etc.

EXAMPLES

Preparation of Coatings

The pigment (e.g., graphene sheets, graphite) is ground in about 10 weight percent loading with the carrier (isopropanol) in a vertical ball mill for about six hours using 3/16" stainless steel balls. If a dispersant is used, it is also ground with the pigment.

In method A, the resulting dispersion is combined with the binder and ammonium salt (if used) and blended in a high shear mixer (a homogenizer having a roto-stator overhead stirrer) operating at about 33,000 RPM for about three minutes.

In method B, the resulting dispersion is ground for about 90 minutes at about 20-25° C. in an Eiger Mini 250 Type M250-VSE-TEFV horizontal grinding mill using 0.3 mm of 5% yttrium stabilized 0.3 mm zirconium oxide grinding media. (In some cases, the dispersion was ground for more than 90 minutes. In these cases, the grinding time is indicated in the table by a number in parentheses by the letter "B" indicating the method.) The pigments are present in a loading of about 2-6 weight percent relative to the carrier. The dispersion is then combined with the binder and ammonium salt (if used) and blended in a high shear mixer (a homogenizer having a roto-stator overhead stirrer) operating at about 33,000 RPM for about three minutes.

Unless otherwise specified, the coatings contain about 93 weight percent pigment and about 7 weight percent polymeric binder, based on the total weight of pigment and binder. The final loading is about 2-5 weight percent solids based on the amount of solids and carrier.

Preparation of Test Samples

The coatings in the form of liquid dispersions are printed on a coated PET film using a doctor blade (DB), spraying, or roll coating with a #28 or #16 wire rod. The samples are dried in an oven at 125° C. to form a film. Testing is done on the printed films. In some cases, the printed sample is allowed to air dry before it is put into the oven, while in others, it is put into the oven directed after printing. The later procedure is indicated in the tables with an asterisk next the method type for each sample.

Conductivity Measurements

Electrically conductivity is determined using a four-point probe method. A rectangular four-point probe is placed on a sample. A potential difference (about 5-20 V) is applied across the sample and the current (I) is monitored with a multimeter. Another multimeter is used to measure the voltage (V) across two points having a known separation along the direction of the current.

The resistance is measured using Ohm's law, i.e. $R=V/I$; where R, V, and I are the resistance, voltage, and current, respectively. Resistivity ($\sigma$) is found by the equation $\sigma=RA/L$, where A and L are the cross sectional area of the film through which current flows and the length over which the potential difference is measured, respectively. Conductivity ($\kappa$) is found by the equation $\kappa=1/\sigma$. A is calculated by using the measured thickness of the sample.

The results are given in the tables. In some cases more than one measurement is made and the results are averaged. In these cases, the average of the sample thicknesses used and the average of the measured conductivities are presented with the number of measurement made.

Ingredients Used in the Examples

Graphene sheets 55 refers to graphene sheets having a carbon to oxygen molar ratio of approximately 52-55:1.

Graphene sheets 67 refers to graphene sheets having a carbon to oxygen molar ratio of approximately 67:1.

Graphene sheets 96 refers to graphene sheets having a carbon to oxygen molar ratio of approximately 96:1.

Graphene sheets 130 refers to graphene sheets having a carbon to oxygen molar ratio of approximately 130:1.

Ammonium salt refers to BYK-ES80, an alkylolammonium salt of an unsaturated acidic carboxylic acid ester supplied in a butanol solution by BYK USA, Wallingford, Conn. The amounts used are about 33 weight percent (based on the actual amount of salt) relative to the total amount of salt and pigment.

Natural graphite refers to 230 graphite supplied by Asbury Carbons, Asbury, N.J.

Synthetic graphite refers to APS graphite supplied by Asbury Carbons, Asbury, N.J.

Dispersant refers to DISPERBYK® 190, a solution of a high molecular weight block copolymer supplied by BYK USA, Wallingford, Conn. Used in about 2 weight percent based on the total amount of binder of pigment.

The following Binders are Used:

Examples 1-15 and 19 & Comparative Examples 1-5 and 7: Joncryl® 682, a styrene/acrylic resin supplied by BASF.

Examples 16 and 17: Versamid 750, a low melting point polyamide supplied by Cognis.

Example 18 and Comparative Example 6: Poly(ethylene oxide) having an average molecular weight of about 600,000.

TABLE 1

|  | Comp. Ex. 1 | Ex. 1 | Comp. Ex. 2 | Ex. 2 | Comp. Ex. 3 | Ex. 3 | Comp. Ex. 4 | Ex. 4 | Comp. Ex. 5 | Ex. 5 |
|---|---|---|---|---|---|---|---|---|---|---|
| Graphene sheets | 96 | 96 | 96 | 96 | 55 | 55 | 55 | 55 | 55 | 55 |
| Graphite | nat. | nat. | nat. | nat. | nat. | nat. | nat. | nat. | nat. | nat. |
| Ratio of graphene sheets to graphite | 50:50 | 50:50 | 50:50 | 50:50 | 50:50 | 50:50 | 50:50 | 50:50 | 34:66 | 34:66 |
| Dispersant | N | N | N | N | Y | Y | Y | Y | N | N |
| Ammonium salt? | N | Y | N | Y | N | Y | N | Y | N | Y |
| Preparation method | A | A | B | B | A | A | B | B | A* | A* |
| Application method | DB | DB | DB | DB | DB | DB | DB | DB | DB | DB |
| Thickness (μm) (# of meas.) | 8 (2) | 9 | 10 (2) | 8 (4) | 30 | 27 (2) | 7 | 8 | 9 (2) | 10 |
| Conductivity (S/cm) (# of meas.) | 15 (2) | 30 | 21 (2) | 68 (4) | 12 | 14 (2) | 23 | 45 | 17 (2) | 34 |

TABLE 2

|  | Comp. Ex. 6 | Ex. 6 | Comp. Ex. 7 | Ex. 7 | Comp. Ex. 8 | Ex. 8 |
|---|---|---|---|---|---|---|
| Graphene sheets | 67 | 67 | 55 | 55 | 55 | 55 |
| Graphite | nat. | nat. | nat. | nat. | nat. | nat. |
| Ratio of graphene sheets to graphite | 25:75 | 25:75 | 15:85 | 15:85 | 15:85 | 15:85 |
| Dispersant | N | N | N | N | N | N |
| Ammonium salt? | N | Y | N | Y | N | Y |
| Preparation method | B | B | A* | A* | B* | B* |
| Application method | DB | DB | DB | DB | DB | DB |
| Thickness (μm) (# of measurements) | 10 (2) | 6-10 | 10 | 8 (4) | 10 | 8 (4) |
| Conductivity (S/cm) (# of measurements) | 19 (2) | 40 | 37 | 63 (4) | 40 | 107 (4) |

TABLE 3

|  | Ex. 9 | Ex. 10 | Ex. 11 | Ex. 12 | Ex. 13 | Ex. 14 | Ex. 15 |
|---|---|---|---|---|---|---|---|
| Graphene sheets | 55 | 55 | 55 | 130 | 130 | 130 | 130 |
| Graphite | nat | nat | nat | syn | syn | syn | syn |
| Ratio of graphene sheets to graphite | 20:80 | 20:80 | 20:80 | 20:80 | 20:80 | 20:80 | 20:80 |
| Dispersant | Y | Y | Y | Y | Y | Y | Y |
| Ammonium salt? | Y | Y | Y | Y | Y | Y | Y |
| Preparation method | B* | B* | B* | A* | B* (360) | B* (360) | B* (360) |
| Application method | DB | DB | Wire rod (#28) | Wire rod (#28) | Wire rod (#28) | DB | Spray |
| Thickness (μm) (# of measurements) | 23 | 13 | 2 | 7 | 5 (2) | 6 (3) | 1.5 |
| Conductivity (S/cm) (# of measurements) | 83 | 147 | 107 | 24 | 109 (2) | 136 (3) | 130 |

TABLE 4

|  | Ex. 16 | Ex. 17 |
|---|---|---|
| Graphene sheets | 130 | 130 |
| Graphite | syn | syn |
| Ratio of graphene sheets to graphite | 20:80 | 20:80 |
| Dispersant | Y | Y |
| Ammonium salt? | Y | Y |
| Preparation method | B* (360) | B* (360) |
| Application method | DB | Spray |
| Thickness (μm) (# of measurements) | 4 (2) | 1 (4) |
| Conductivity (S/cm) (# of measurements) | 277 (2) | 156 (4) |

TABLE 5

|  | Ex. 18 | Comp. Ex. 6 | Ex. 19 | Comp. Ex. 7 |
|---|---|---|---|---|
| Graphene sheets | 96 | 96 | — | — |
| Graphite | — | — | syn | syn |
| Ammonium salt? | Y | N | Y | N |
| Preparation method | B* | B* | A* | A* |
| Application method | Wire rod (#28) | Wire rod (#28) | Wire rod (#28) | Wire rod (#28) |
| Thickness (μm) (# of measurements) | 1 (2) | 2 (2) | 7 (2) | 9 (2) |
| Conductivity (S/cm) (# of measurements) | 31 (2) | 19 (2) | 18 (2) | 11 (2) |

The invention claimed is:

1. A composition, comprising graphene sheets and graphite, wherein the ratio by weight of graphite to graphene sheets is from about 2:98 to 98:2, at least one polymeric binder, at least one organic compound having at least one charged functional group, and at least one multi-chain lipid.

2. The composition of claim 1, wherein the organic molecule is an ammonium salt.

3. The composition of claim 1, wherein the organic molecule is an alkylol ammonium salt of a carboxylic acid.

4. The composition of claim 1, wherein the polymer binder comprises a polyamide.

5. The composition of claim 1, wherein the polymer binder comprises a polyamide copolymer having a melting point of below about 150° C.

6. The composition of claim 1, wherein the graphene sheets have a surface area of at least about 300 m$^2$/g.

7. The composition of claim 1, wherein the graphene sheets have a surface area of at least about 400 m$^2$/g.

8. The composition of claim 1, wherein the graphene sheets have a carbon to oxygen molar ratio of at least about 25:1.

9. The composition of claim 1, wherein the graphene sheets have a carbon to oxygen molar ratio of at least about 75:1.

10. The composition of claim 1 having an electrical conductivity of at least about 10 S/cm.

11. The composition of claim 1 having an electrical conductivity of at least about 10$^2$ S/cm.

12. The composition of claim 1 in the form of a coating or ink.

13. A article printed with the composition of claim 1.

14. The composition of claim 1, further comprising a carrier.

15. The composition of claim 1, wherein the ratio by weight of graphite to graphene sheets is from about 20:80 to about 80:20.

16. The composition of claim 1, wherein the ratio by weight of graphite to graphene sheets is from about 30:70 to about 70:30.

17. The composition of claim 1, wherein the ratio by weight of graphite to graphene sheets is from about 10:90 to about 90:10.

18. The composition of claim 1, wherein the ratio by weight of graphite to graphene sheets is from about 5:95 to about 95:5.

* * * * *